(12) United States Patent
King et al.

(10) Patent No.: US 8,967,051 B2
(45) Date of Patent: *Mar. 3, 2015

(54) TRANSPORT SYSTEM POWERED BY SHORT BLOCK LINEAR SYNCHRONOUS MOTORS AND SWITCHING MECHANISM

(75) Inventors: Nathanael N. King, Somerville, MA (US); Brian M. Perreault, Stow, MA (US); Tracy M. Clark, Bedford, MA (US); Richard D. Thornton, Concord, MA (US); Jason Young, Marlborough, MA (US); Michael W. Bottasso, Maynard, MA (US)

(73) Assignee: Magnemotion, Inc., Devens, MA (US)

( * ) Notice: Subject to any disclaimer, the term of this patent is extended or adjusted under 35 U.S.C. 154(b) by 40 days.

This patent is subject to a terminal disclaimer.

(21) Appl. No.: 12/692,441

(22) Filed: Jan. 22, 2010

(65) Prior Publication Data

US 2010/0236445 A1 Sep. 23, 2010

Related U.S. Application Data

(63) Continuation-in-part of application No. 12/359,022, filed on Jan. 23, 2009, now Pat. No. 8,616,134.

(60) Provisional application No. 61/184,570, filed on Jun. 5, 2009.

(51) Int. Cl.
*B60L 13/06* (2006.01)
*B60L 1/00* (2006.01)
(Continued)

(52) U.S. Cl.
CPC ............... *B60L 13/003* (2013.01); *B60L 13/10* (2013.01); *E01B 25/34* (2013.01); *B60L 2200/26* (2013.01)
USPC ............................................. 104/284; 191/6

(58) Field of Classification Search
USPC ........ 104/281–284, 130.01–130.03; 191/2, 6, 191/22 R, 33 R
See application file for complete search history.

(56) References Cited

U.S. PATENT DOCUMENTS 527,857 A 10/1894 Hutin et al.
3,513,338 A 5/1970 Poloujadoff
(Continued)

FOREIGN PATENT DOCUMENTS

CN 101378931 A 3/2009
EP 0 612 446 A1 8/1994
(Continued)

OTHER PUBLICATIONS

International Search Report & Written Opinion, Application No. PCT/US10/21839, Mailed Mar. 26, 2010, 17 pages.
(Continued)

*Primary Examiner* — R. J. McCarry, Jr.
(74) *Attorney, Agent, or Firm* — Nutter McClennen & Fish LLP; David J. Powsner; Derek P. Roller

(57) ABSTRACT

Aspects of the invention provide a transport system powered by short block Linear Synchronous Motors (LSMs). The use of short blocks allows vehicles to move under precise control even when they are in close proximity to each other. The design allows the vehicles to be propelled and guided while negotiating sharp turns and negotiating merge and diverge switches. A coreless LSM can be used to create propulsive force without attractive force so as to allow a relatively high drag vehicle suspension, such as a vehicle sliding on a smooth surface. Further aspects of the invention provide a switching member that is selectively moveable relative to a guideway in order to change a magnetic force acting on the vehicle transverse to a direction of motion of the vehicle.

41 Claims, 21 Drawing Sheets

(51) Int. Cl.
*B60L 13/00* (2006.01)
*B60L 13/10* (2006.01)
*E01B 25/34* (2006.01)

(56) References Cited

U.S. PATENT DOCUMENTS

| | | | |
|---|---|---|---|
| 3,706,922 A | 12/1972 | Inagaki | |
| 3,768,417 A | 10/1973 | Thornton et al. | |
| 3,803,466 A | 4/1974 | Starkey | |
| 3,808,977 A | 5/1974 | Smoot et al. | |
| 3,835,785 A | 9/1974 | Kirschner et al. | |
| 3,842,751 A | 10/1974 | Thornton et al. | |
| 3,850,109 A | 11/1974 | Thornton | |
| 3,871,301 A | 3/1975 | Kolm et al. | |
| 3,890,421 A | 6/1975 | Habozit | |
| 3,904,942 A | 9/1975 | Holtz | |
| 3,938,018 A | 2/1976 | Dahl | |
| 4,013,014 A | 3/1977 | Holtz | |
| 4,015,540 A | 4/1977 | Roxberry | |
| 4,061,089 A | 12/1977 | Sawyer | |
| 4,081,723 A | 3/1978 | Vetter et al. | |
| 4,160,181 A | 7/1979 | Lichtenberg | |
| 4,311,853 A | 1/1982 | Cree | |
| 4,311,953 A | 1/1982 | Fukuda et al. | |
| 4,352,960 A | 10/1982 | Dormer et al. | |
| 4,415,959 A | 11/1983 | Vinciarelli | |
| 4,538,214 A | 8/1985 | Fisher et al. | |
| 4,571,236 A | 2/1986 | Adams | |
| 4,635,560 A | 1/1987 | Ballantyne | |
| 4,675,582 A | 6/1987 | Hommes et al. | |
| 4,689,530 A | 8/1987 | Nakamura et al. | |
| 4,698,996 A | 10/1987 | Kreft et al. | |
| 4,704,568 A | 11/1987 | Beck et al. | |
| 4,736,747 A | 4/1988 | Drake | |
| 4,789,815 A | 12/1988 | Kobayashi et al. | |
| 4,825,111 A | 4/1989 | Hommes et al. | |
| 4,841,869 A | 6/1989 | Takeuchi et al. | |
| 4,873,677 A | 10/1989 | Sakamoto et al. | |
| 4,892,980 A | 1/1990 | Riley | |
| 4,920,318 A | 4/1990 | Misic et al. | |
| 4,982,556 A | 1/1991 | Tisma | |
| 5,023,495 A | 6/1991 | Ohsaka et al. | |
| 5,055,775 A | 10/1991 | Scherz et al. | |
| 5,091,665 A | 2/1992 | Kelly | |
| 5,092,450 A | 3/1992 | Schommartz et al. | |
| 5,094,172 A | 3/1992 | Kummer | |
| 5,121,830 A | 6/1992 | Sakamoto et al. | |
| 5,156,092 A * | 10/1992 | Hirtz | 104/282 |
| 5,175,976 A | 1/1993 | Petry et al. | |
| 5,185,984 A | 2/1993 | Tisma | |
| 5,225,725 A | 7/1993 | Shiraki et al. | |
| 5,277,285 A * | 1/1994 | Musachio | 191/6 |
| 5,293,308 A | 3/1994 | Boys et al. | |
| 5,521,444 A | 5/1996 | Foreman | |
| 5,528,113 A | 6/1996 | Boys et al. | |
| 5,542,356 A | 8/1996 | Richert et al. | |
| 5,560,476 A | 10/1996 | Lee | |
| 5,605,100 A | 2/1997 | Morris et al. | |
| 5,606,256 A | 2/1997 | Takei | |
| 5,653,173 A | 8/1997 | Fischer | |
| 5,684,344 A | 11/1997 | Takei | |
| 5,715,657 A | 2/1998 | Mondani et al. | |
| 5,757,091 A | 5/1998 | Sogabe et al. | |
| 5,768,856 A | 6/1998 | Odenthal | |
| 5,770,936 A | 6/1998 | Hirai et al. | |
| 5,793,128 A | 8/1998 | Nanba et al. | |
| 5,821,638 A | 10/1998 | Boys et al. | |
| 5,831,352 A | 11/1998 | Takei | |
| 5,839,554 A | 11/1998 | Clark | |
| 5,839,567 A | 11/1998 | Kyotani et al. | |
| 5,907,200 A | 5/1999 | Chitayat | |
| 5,925,943 A | 7/1999 | Chitayat | |
| 5,936,319 A | 8/1999 | Chitayat | |
| 5,939,845 A | 8/1999 | Hommes | |
| 5,942,817 A | 8/1999 | Chitayat | |
| 5,952,742 A | 9/1999 | Stoiber et al. | |
| 5,965,963 A | 10/1999 | Chitayat | |
| 5,994,798 A | 11/1999 | Chitayat | |
| 6,011,508 A | 1/2000 | Perreault et al. | |
| 6,100,663 A | 8/2000 | Boys et al. | |
| 6,101,952 A * | 8/2000 | Thornton et al. | 104/282 |
| 6,105,338 A | 8/2000 | Kalany et al. | |
| 6,118,249 A | 9/2000 | Brockmann et al. | |
| 6,191,507 B1 | 2/2001 | Peltier et al. | |
| 6,202,392 B1 | 3/2001 | Greenwell et al. | |
| 6,220,424 B1 | 4/2001 | Fluck | |
| 6,286,290 B1 | 9/2001 | Fluck | |
| 6,307,766 B1 | 10/2001 | Ross et al. | |
| 6,317,338 B1 | 11/2001 | Boys et al. | |
| 6,326,713 B1 | 12/2001 | Judson | |
| 6,397,755 B1 | 6/2002 | Kamler | |
| 6,397,990 B1 | 6/2002 | Brien et al. | |
| 6,417,584 B1 | 7/2002 | Chitayat | |
| 6,421,984 B1 | 7/2002 | Murgatroyd et al. | |
| 6,455,957 B1 | 9/2002 | Chitayat | |
| 6,483,202 B1 | 11/2002 | Boys | |
| 6,499,701 B1 | 12/2002 | Thornton et al. | |
| 6,578,495 B1 | 6/2003 | Yitts et al. | |
| 6,580,185 B2 | 6/2003 | Kang et al. | |
| 6,619,212 B1 | 9/2003 | Stephan et al. | |
| 6,621,183 B1 | 9/2003 | Boys | |
| 6,625,517 B1 | 9/2003 | Bogdanov et al. | |
| 6,637,343 B2 | 10/2003 | Stephan et al. | |
| 6,651,566 B2 | 11/2003 | Stephan et al. | |
| 6,686,823 B2 | 2/2004 | Arntz et al. | |
| 6,713,902 B2 | 3/2004 | Chitayat | |
| 6,715,598 B2 | 4/2004 | Affaticati et al. | |
| 6,781,524 B1 | 8/2004 | Clark et al. | |
| 6,803,744 B1 | 10/2004 | Sabo | |
| 6,834,595 B1 | 12/2004 | Henderson | |
| 6,876,107 B2 | 4/2005 | Jacobs | |
| 6,876,896 B1 | 4/2005 | Ortiz et al. | |
| 6,899,037 B1 | 5/2005 | Cowan, Jr. | |
| 6,910,568 B1 | 6/2005 | Ydoate et al. | |
| 6,911,747 B2 | 6/2005 | Tsuboi et al. | |
| 6,917,136 B2 | 7/2005 | Thornton et al. | |
| 6,983,701 B2 | 1/2006 | Thornton et al. | |
| 7,134,258 B2 | 11/2006 | Kalany et al. | |
| 7,243,752 B2 | 7/2007 | Green et al. | |
| 7,432,622 B2 | 10/2008 | Griepentrog et al. | |
| 7,448,327 B2 | 11/2008 | Thornton et al. | |
| 7,458,454 B2 | 12/2008 | Mendenhall | |
| 7,511,250 B2 | 3/2009 | Lindig | |
| 7,525,283 B2 | 4/2009 | Cheng et al. | |
| 7,538,469 B2 | 5/2009 | Thornton et al. | |
| 7,554,316 B2 | 6/2009 | Stevens et al. | |
| 7,602,142 B2 | 10/2009 | Weber et al. | |
| 7,605,496 B2 | 10/2009 | Stevens et al. | |
| 7,633,235 B2 | 12/2009 | Boys | |
| 7,714,537 B2 | 5/2010 | Cheng et al. | |
| 7,825,537 B2 | 11/2010 | Freer | |
| 7,863,861 B2 | 1/2011 | Cheng et al. | |
| 7,868,587 B2 | 1/2011 | Stevens et al. | |
| 7,913,606 B2 | 3/2011 | Schneider et al. | |
| 7,926,644 B2 | 4/2011 | Mendenhall | |
| 7,932,798 B2 | 4/2011 | Tolle et al. | |
| 7,952,322 B2 | 5/2011 | Partovi et al. | |
| 7,952,324 B2 | 5/2011 | Cheng et al. | |
| 8,113,310 B2 | 2/2012 | Gurol et al. | |
| 8,616,134 B2 * | 12/2013 | King et al. | 104/284 |
| 2002/0093252 A1 | 7/2002 | Kang et al. | |
| 2003/0217668 A1 * | 11/2003 | Fiske et al. | 104/282 |
| 2005/0172850 A1 | 8/2005 | Sakita | |
| 2005/0225188 A1 | 10/2005 | Griepentrog et al. | |
| 2007/0044676 A1 | 3/2007 | Clark et al. | |
| 2007/0283841 A1 * | 12/2007 | Lopatinsky et al. | 104/284 |
| 2008/0148990 A1 | 6/2008 | Wamble et al. | |
| 2009/0107806 A1 | 4/2009 | Mendenhall | |
| 2010/0054897 A1 | 3/2010 | Bufano et al. | |
| 2010/0186618 A1 | 7/2010 | King et al. | |
| 2010/0192799 A1 | 8/2010 | Miller | |
| 2010/0200316 A1 | 8/2010 | Gurol et al. | |

(56) References Cited

U.S. PATENT DOCUMENTS

| | | |
|---|---|---|
| 2013/0008336 A1 | 1/2013 | Young et al. |
| 2013/0074724 A1 | 3/2013 | King et al. |
| 2014/0182478 A1 | 7/2014 | King et al. |

FOREIGN PATENT DOCUMENTS

| | | |
|---|---|---|
| EP | 0 695 703 A1 | 2/1996 |
| EP | 0 754 366 A1 | 1/1997 |
| EP | 2 131 484 A1 | 12/2009 |
| EP | 2 182 628 A1 | 5/2010 |
| GB | 2 260 743 A | 4/1993 |
| JP | 62-178104 A | 8/1987 |
| JP | 03-074109 A | 3/1991 |
| JP | 05-165521 A | 7/1993 |
| JP | 06-165313 A | 6/1994 |
| JP | 07-087618 A | 3/1995 |
| JP | 07-193914 A | 7/1995 |
| JP | 11-127505 A | 5/1999 |
| JP | 2003-339182 A | 11/2003 |
| WO | 93/10594 A1 | 5/1993 |
| WO | 94/04404 A1 | 3/1994 |
| WO | 98/50760 A2 | 11/1998 |
| WO | 00/64742 A2 | 11/2000 |
| WO | 00/64751 A1 | 11/2000 |
| WO | 00/64753 A1 | 11/2000 |
| WO | 00/64791 A1 | 11/2000 |
| WO | 01/85581 A1 | 11/2001 |

OTHER PUBLICATIONS

International Search Report and Written Opinion mailed Aug. 6, 2012 for Application No. PCT/US2012/041263 (13 Pages).

Chinese Office Action for Application No. 2010800131883, issued Mar. 7, 2013(7 pages) with partial English summary.

Elliot, Novel Application of a Linear Synchoronous Motor Drive. Cegelec Projects Ltd. IEE. 1997. 5 pages.

International Preliminary Report on Patentability mailed Dec. 27, 2013 for Application No. PCT/US2012/041263 (8 pages).

International Search Report and Written Opinion for Application No. PCT/US2013/060286 mailed Feb. 18, 2014 (15 Pages).

Japanese Office Action for Application No. 2011-548142 issued Jan. 21, 2014 (11 Pages).

* cited by examiner

Typical waveform of current in a coil as a vehicle moves by

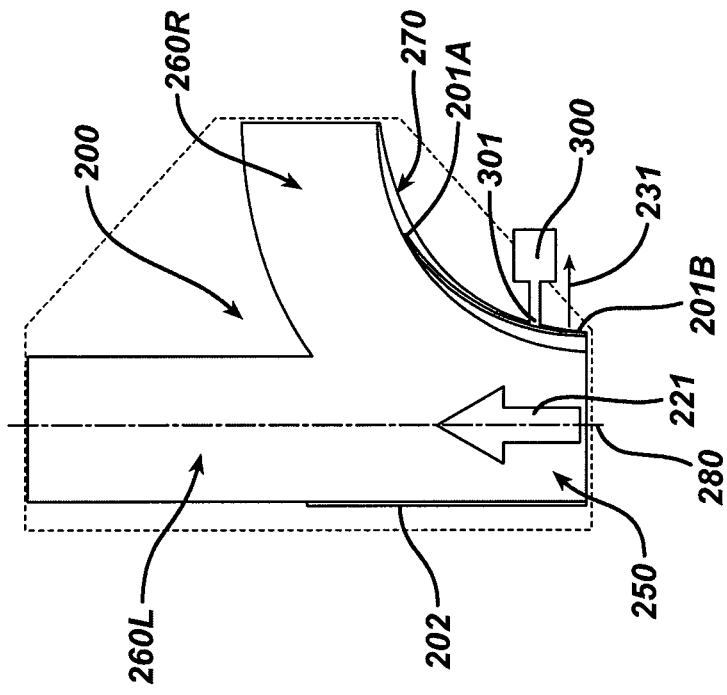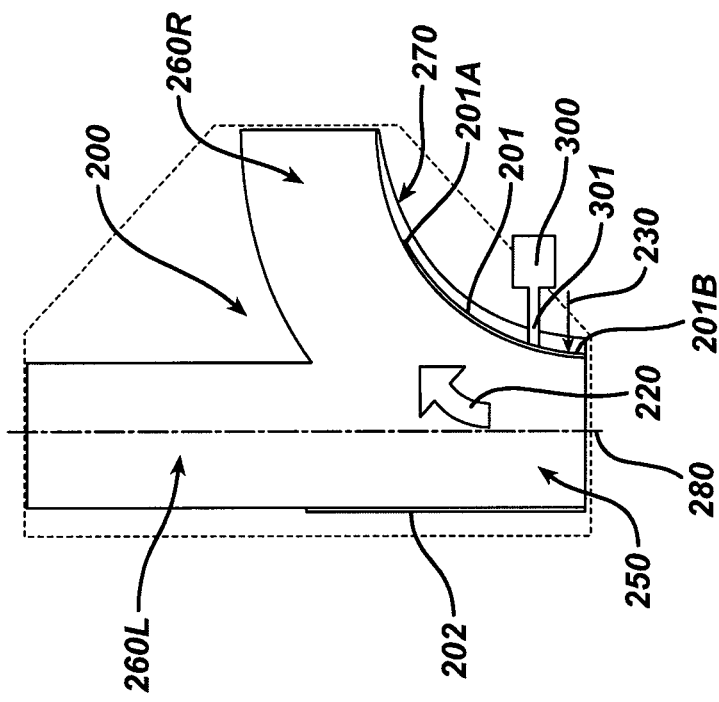

TRANSPORT SYSTEM POWERED BY SHORT BLOCK LINEAR SYNCHRONOUS MOTORS AND SWITCHING MECHANISM

CROSS REFERENCE AND RELATED APPLICATIONS

The present application is a continuation-in-part of, and claims the benefit of, U.S. patent application Ser. No. 12/359,022, filed Jan. 23, 2009, now U.S. Pat. No. 8,616,134 entitled "Transport System Powered by Short Block Linear Synchronous Motors" and also claims the benefit of a U.S. Provisional Patent Application bearing Ser. No. 61/184,570, filed Jun. 5, 2009, entitled "Improved Transport System Powered By Short Block Linear Synchronous Motors." The teachings of the foregoing applications are hereby incorporated herein by reference.

BACKGROUND OF THE INVENTION

The invention pertains to transport systems and more particularly, by way of example, to guideway-based transport system with short block linear synchronous motors. The invention has application, by way of non-limiting example, in production lines, laboratories and other applications requiring complex guideways, sharp turns, merge and diverge switching, and/or inverted operation.

There are many types of transport systems that can move objects on a guideway. Examples include: wheel-suspended vehicles propelled by rotary or linear motors, maglev or air-cushion suspended vehicles propelled by linear motors or cables, vehicles that move in tubes propelled by air pressure, vehicles supported or guided by bearings, and vehicles that are moved on conveyor belts. Existing transport systems have many useful applications but there are opportunities for substantial improvement, for example, in the precise movement of relatively small and closely spaced objects on a complex guideway.

Small and medium size objects are often transported on conveyor belts because this eliminates the need for wheels or other mechanisms to suspend, guide and propel the objects. Belt transport systems are relatively inexpensive but they lack precise control that is often needed and they require substantial maintenance because of many moving parts. Other approaches to low cost transport include air propelled vehicle moving in tubes and the use of gravitational forces to move objects down an incline, but these approaches have even less precise control.

The advantages of using linear synchronous motor (LSM) propulsion are well known and described in other patents (by way of non-limiting example, U.S. Pat. Nos. 7,458,454, 7,448,327, 6,983,701, 6,917,136, 6,781,524, 6,578,495, 6,499,701, 6,101,952, and 6,011,508, all assigned to the assignee hereof and the teachings of all of which are incorporated herein by reference), but in many cases, particularly, for example, when moving small and closely spaced objects, the LSM can be more expensive and provide less throughput than competing propulsive systems.

In view of the foregoing, an object of the invention is to provide improved transport systems, apparatus and methods.

A related object of the invention is to provide such systems, apparatus and methods as take advantage of LSM technologies.

Another related object of the invention is to provide such systems, apparatus and methods as are adapted for transport of small objects and/or medium-sized objects.

A further related object of the invention is to provide such systems, apparatus and methods as are adapted for use with closely-spaced objects.

Still another object of the invention is to provide such systems, apparatus and methods as are adapted for use in production lines, laboratories and other applications requiring complex guideways, sharp turns, merge and diverge switching, and/or inverted operation.

SUMMARY OF THE INVENTION

The foregoing are among the objects attained by the invention, which provides in some aspects an LSM-based transport system that includes a guideway with a plurality of coreless propulsion coils disposed along a region in which one or more vehicles disposed on the guideway are to be propelled, as well as electronic power and control circuitry that excites the propulsion coils independently so as to propel the vehicles along the guideway. The vehicles, according to these aspects of the invention, each include a magnetic flux source—for example, one or more Halbach or other magnet arrays.

Systems according to the foregoing aspect are advantageous for, among other reasons, that the vehicles on the guideway can be moved (or propelled) independently of one another in a controlled fashion—e.g., without risk of collision or uncontrolled motion—regardless of their proximity to other vehicles on the guideway.

Related aspects of the invention provide transport systems as described above in which the vehicles are disposed for sliding motion along guideway. In these aspects, the vehicles can have a low coefficient of friction with the guideway, e.g., a coefficient of friction of less than substantially 0.2.

The guideway, according to related aspects of the invention, can include guidance structure—such as rails—that facilitate maintaining the vehicles on the guideway (or, put another way, that inhibit the vehicles from moving off the guideway).

In related aspects of the invention, the guideway of transport systems of the type described above is made up of a plurality of coupled (e.g., interlocked) modules. The propulsion coils may be mounted in those modules and more particularly, according to some aspects of the invention, on printed circuit boards that make up the modules. The coils are disposed within the modules so as to be in close proximity to magnet arrays (or other flux sources) of vehicles passing over them.

In still other related aspects, the invention provides transport systems as described above in which the modules comprise power controllers that form part of the electronic power and control circuitry and that are selectively electrically coupled to one or more of the propulsion coils, e.g., of the respective modules. Microprocessor(s) and/or switches can also be provided to provide electrical coupling between the power control circuitry and the propulsion coils.

Yet still other aspects of the invention provide transport systems as described above in which the guideway comprises merge and/or diverge regions, each of which may include mechanically and/or magnetically actuated switches to alter the course of passing vehicles. These merge and diverge regions, as well as straight-away regions, that make up the guideway may comprise one or more of the aforementioned coupled modules.

Further related aspects of the invention provide transport systems as described above in which at least one of the diverge regions comprises a plurality of coreless propulsion coils spaced along a region in which the course of passing vehicles is altered—that is, spaced along a corner, curve and/or branch—so as to propel the vehicles through the diverge. According to related aspects of the invention, a merge region can be similarly equipped with a plurality of such coils.

Further aspects of the invention provide a transport system, e.g., as described above, that includes a switching member that is disposed adjacent a diverge (or switching) region of the guideway and that is selectively moveable relative to the guideway in order to change a magnetic force acting on the vehicle transverse to a direction of motion of the vehicle along the guideway.

According to related aspects of the invention, the switching member of a transport system, e.g., as described above, has (i) a first configuration that is associated with motion of the vehicle from an ingress path of the diverge or switching region to the first egress path of that region, and (ii) a second configuration that is associated with motion of the vehicle from the ingress path to a second egress path of the region.

According to further related aspects of the invention, the switching member of a transport system, e.g., as described above, comprises a ferromagnetic material that is configured to move, e.g., under control of an actuator, by at least one of pivoting, translating, and bending.

According to further related aspects of the invention, the switching region of a transport system, e.g., as described above can include a further moveable switching member that is disposed adjacent the switching or diverge region, e.g., opposite the aforementioned switching member, and that is selectively moveable in cooperation therewith to change a magnetic force acting on the vehicle transverse to a direction of motion of the vehicle along the guideway.

According to further related aspects of the invention, the switching region of a transport system, e.g., as described above, can include a further switching member that is fixed, rather than moveable. This fixed member effects a magnetic attraction force on the passing vehicle sufficient to bias it toward a one of the egresses, e.g., when the switching member is not positioned to effect routing to the another egress.

Other aspects of the invention provide guideways, guideway modules, and vehicles for use thereon, constructed and/or operated as discussed above. Still other aspects of the invention provide methods of operating transport systems, guideways, guideway modules, and vehicles for use thereon paralleling the foregoing.

BRIEF DESCRIPTION OF DRAWINGS

A more complete understanding of the invention may be attained by reference to the drawings, in which:

FIGS. 20A-20B show a top view of a right-diverge section of a guideway in a system according to one practice of the invention.

DETAILED DESCRIPTION OF THE ILLUSTRATED EMBODIMENT

Introduction

Described here is an LSM-based transport system that allows vehicles to move on a guideway that can be complex and that can include sharp horizontal and vertical turns, merge and diverge switching, and inverted operation. Examples of applications include: moving bottles on an assembly line while they are being filled and capped, moving vials in a laboratory for analysis, moving electronic devices along a production line so that robots can insert components, and sorting objects that arrive from a multiplicity of sources and must be delivered to appropriate locations. In some cases it is feasible to use wheels, bearing or other rolling elements to assist in suspension and guidance, but this invention can also be used in cases where there are no wheels (or other rolling elements) and the vehicles slide on a guideway's running surface. Wheel-less vehicles can be small and inexpensive when the objects to be moved are not too large. For heavier vehicles the same short block design is suitable for wheel- or bearing-based suspension and guidance.

The result is a transport system that provides an economically viable means of using LSM propulsion to propel and control closely spaced small to medium size vehicles on a guideway.

Among other aspects of the systems described herein are LSM motor modules that also function as the transport system track (or "guideway") pieces. A selection of standard track building blocks fit together in a plug-and-play manner to form an almost endless variety of layout options. The motor modules (or "motors", for short) can contain not only the propulsion and intelligent routing elements, but also the guidance and structural support features to allow for rapid assembly and track configuration. The system is ideally suited, by way of non-limiting example, for environments requiring clean operation and/or wash down capability. It can also support "track and trace" requirements, as each vehicle can be uniquely identified and constantly tracked throughout the system.

A suspension system with a coefficient of friction obtainable with sliding motion can beneficially be used with an LSM with negligible attractive force. This is achieved, in the illustrated embodiment, by using a coreless motor with propulsion coils mounted, e.g., in close proximity to the vehicle magnets.

The text that follows describes components and operation of embodiments of the invention. It is understood that many variations on this design are possible and are contemplated by the invention, but this description shows how to achieve the foregoing and other objectives with a simple system that can be manufactured at a reasonable cost.

Guideway

Figure 1:
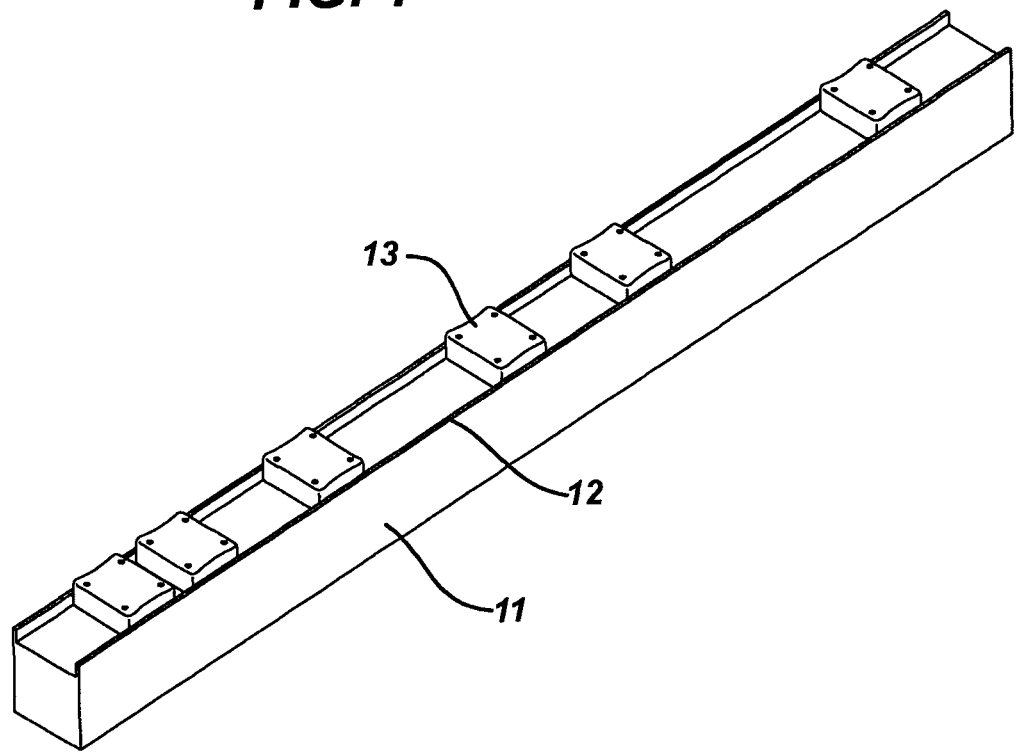
FIG. 1 depicts a system according to the invention, including a straight guideway and vehicles propelled thereon by an LSM in close proximity while sliding on a low friction guideway surface and guided by rails on the side of the guideway.

FIG. 1 shows a straight section of guideway with vehicles 13 moving in close proximity. The structure of the guideway can provide guidance in one or more dimensions by rails 12 on the side. For applications where the vehicle does not have wheels they slide on the guideway's running surface and special materials (discussed below) are used to minimize friction. The guideway housing 11 contains all of the electronics including position sensing means, propulsion coils, power electronic components, and microprocessors.

The design shown in these Figures is based on vehicles that are about 50 mm wide and 50 to 60 mm long. For larger objects the guideway and vehicle dimensions can be scaled, much as model railroads have been constructed with a variety of scaling factors.

Vehicle

Figure 2:
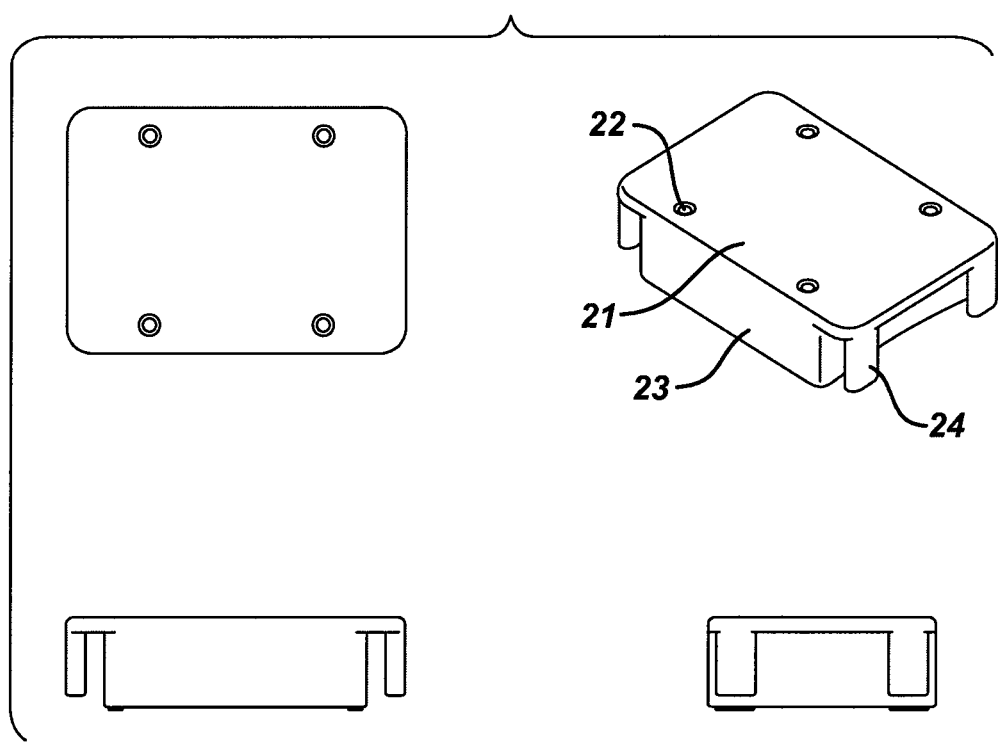
FIG. 2 shows details of a vehicle according to one practice of the invention used to hold objects for moving on the guideway in FIG. 1.
Figure 3:
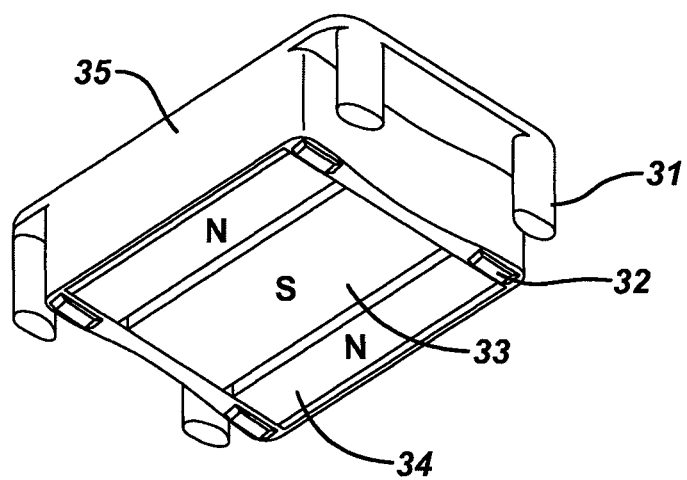
FIG. 3 shows vehicle guidance mechanisms and magnet array in a system according to one practice of the invention.

FIGS. 2 and 3 show a vehicle 21 that can be used as part of the proposed transport system. It is relatively small, about 50 mm square and 20 mm high, and has components 32 (here, disposed on the lower surface of vehicle 21) with running (or "sliding") surfaces that slide on the running (or "sliding") surface of the guideway. Holes 22 in the top of the vehicle are used to mount support mechanisms for the objects that are to be moved.

The vehicle has curved sides 23 that match the sides of a curved guideway so as to allow short radius horizontal turns. It is guided by the guideway and can move in a normal upright position when transporting an object as well as moving in an inverted position when not carrying an object. It can also negotiate vertical turns. Pins 24, 31 in the corners of the vehicle interact with mechanisms in the diverge and modules so as to control the direction of motion.

FIG. 3 is a view of the lower surface of the vehicle and shows the permanent magnets 33, 34 that are mounted near the bottom of the vehicle and provide the means for LSM propulsion.

Figure 4:
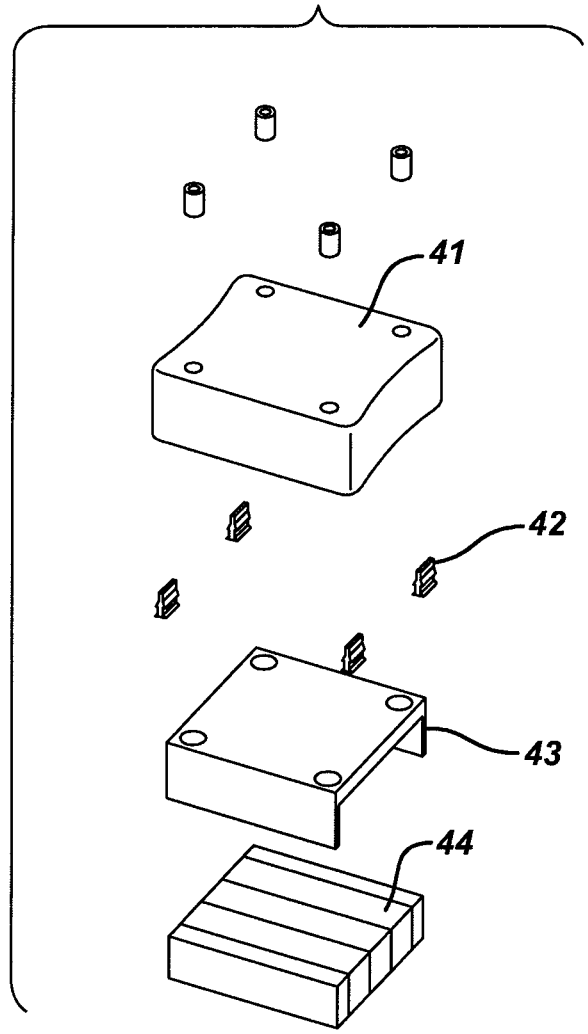
FIG. 4 is similar to FIG. 3 but with a Halbach Array for the magnets.
Figure 5:
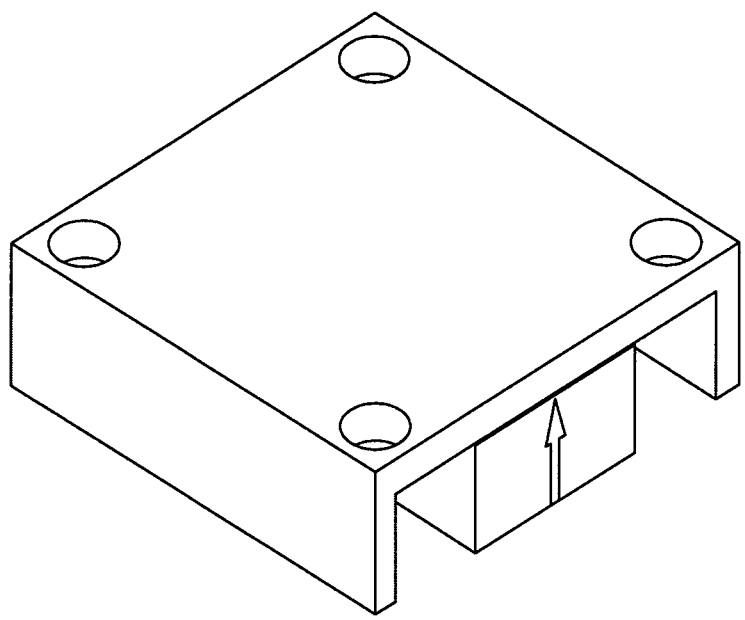
FIG. 5 is similar to FIG. 3 but with a single magnet used for propulsion.

FIG. 4 shows a variation of FIG. 3 in which a Halbach Array 44 is used for the magnet structure so as to create higher force for a given weight. FIG. 5 shows a single magnet structure 51 that is suitable for applications where less force is required.

Larger objects can be moved on this same guideway by using a double-bogey design, as has been used with conventional LSM designs (see, for example, U.S. Pat. No. 7,458, 454, entitled "Three-dimensional Motion Using Single-Pathway Based Actuators," issued Dec. 2, 2008, and U.S. Patent Application 2007/0044676, entitled "Guideway Activated Magnetic Switching of Vehicles," published Mar. 1, 2007, the teachings of both of which are incorporated herein by reference), or by increasing the dimensions of guideway and vehicles.

Low Friction Sliding Surface

Figure 6:
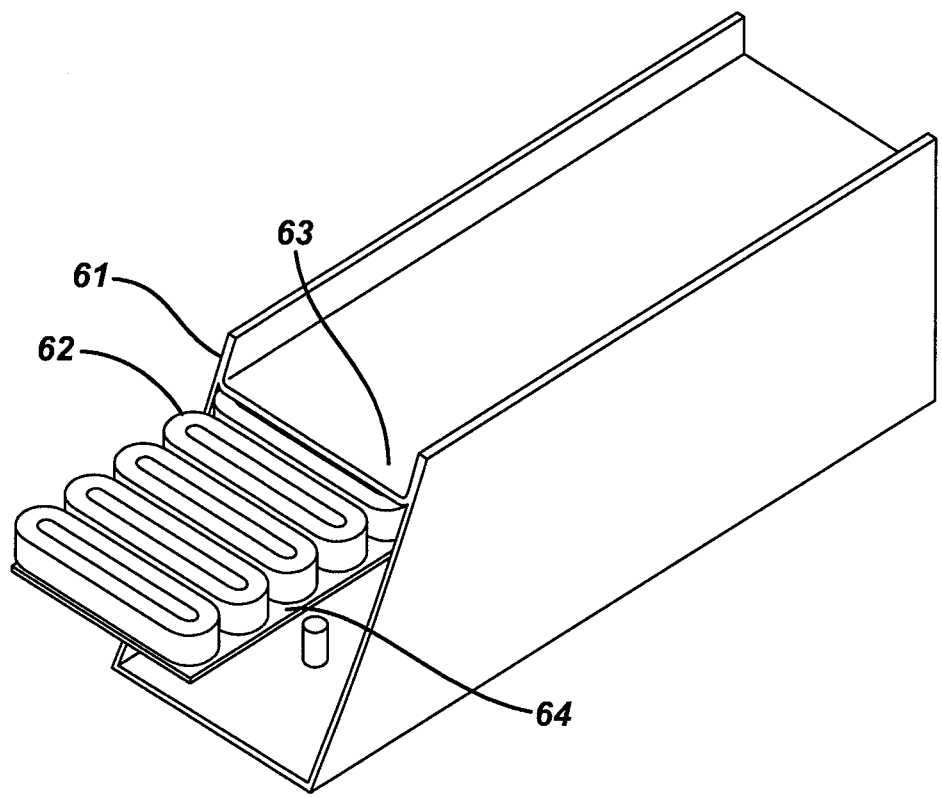
FIG. 6 shows a guideway according to one practice of the invention, including a printed circuit board, with propulsion coils mounted on it, in close proximity to the guideway surface, and connected to power control circuitry on the circuit board.

In order to reduce the required propulsive force and heating from friction, the vehicle and guideway of the illustrated embodiment are designed to minimize the coefficient of friction $c_f$, which is the ratio of the propulsive force needed to move the vehicle to the gravitational force of the vehicle on the guideway. In some cases wheels can be used as a way to reduce this force, but this invention allows the use of wheelless vehicles. FIG. 6 shows the guideway with low friction running (or "sliding") surface 63 that supports vehicles in close proximity to the propulsion coils 64.

Examples of low friction for wheel-less applications include Teflon sliding on Teflon and Teflon sliding on stainless steel. Lower friction is possible if the surface can be lubricated by a thin film, but for many applications this is not allowable so the design assumes no lubrication. It is also preferable that the surface have good wear characteristics so, for example, we might use stainless steel on the guideway and Teflon on the vehicle with the expectation that there would be negligible wear on the steel but the vehicle might eventually need to have its sliding surface replaced, an action that is less expensive than replacing the guideway. Sliders 32 in FIG. 3 are examples of how low friction components can be mounted. They may be designed so as to be replaceable if it is expected that they will wear out before the vehicle reaches end of life.

With some designs $c_f$ can be as low a 0.1 but more practical values are in the range 0.15 to 0.2. Because this is a relatively high value it is preferred that the propulsive force not create substantial downward force on the vehicle. A typical LSM using ferromagnetic material will exert an attractive force that is four to six times the propulsive force and with this much attractive force the vehicle may not be able to move, or if it did move there would be substantial heating and power wasted—in such instances, wheels, bearings or other rolling elements can be incorporated for suspension of the vehicles.

Magnet Array

There are many types of magnet arrays that can be used, one of which is shown in FIG. 3. With this design there is one middle magnet 33 that has the South pole on the lower surface and two half magnets 34 on the ends that have a North Pole on the lower surface. Typically the magnets use NdFeB in order achieve high fields but they can use other materials, such as ceramic when cost or external fields must be low or Samarium Cobalt when the operating temperature is high.

One design consideration is the interaction between magnets on adjacent vehicles. The ferromagnetic piece 35 largely prevents magnetic fields from adjacent vehicles from interfering with each other.

FIG. 4 shows a Halbach Array which can be used where higher force is required and the added cost is acceptable. With this design the magnetic field rotates from one magnet to the next with a resulting higher propulsive force than is possible with the magnet design in FIG. 3. Ferromagnetic shield 43 minimizes interactions between the fields of adjacent vehicles.

FIG. 5 shows a single magnet providing all of the magnetic flux with ferromagnetic material on the ends used to provide a return path. This may not produce as much force but can be less expensive than multi-magnet designs.

Linear Motor Propulsion

FIG. 6 shows coils 64 mounted in close proximity to the guideway running surface 63. Currents in these coils are individually controlled via power electronic components and microprocessors so that each vehicle can be individually controlled even when it is touching neighboring vehicles.

A feature of the illustrated embodiment is the lack of ferromagnetic material that is commonly used in an LSM to make it more efficient. With no ferromagnetic material we can not achieve as high a force, but we can limit the attractive force to a small fraction of the propulsive force and thereby allow strong acceleration and braking forces to move the vehicle when the coefficient of friction is on the order of 0.2 or higher.

In embodiments that use wheel-based vehicles the friction force may be small enough that some ferromagnetic material can be used in the stator so as to achieve higher propulsive force.

Software for controlling the microprocessors can be similar to control software used on LSM designs with blocks that are several coils long. Here, however, position sensing components are located close enough together that they can identify individual vehicles even when the vehicles are touching. Such sensing facilitates control of the movement of the vehicles independently of one another on the guideway. Prior demonstrations of locally commutated LSMs have shown that this software does not require special features.

PC Board Mounted Coils and Control Circuitry

Figure 7:
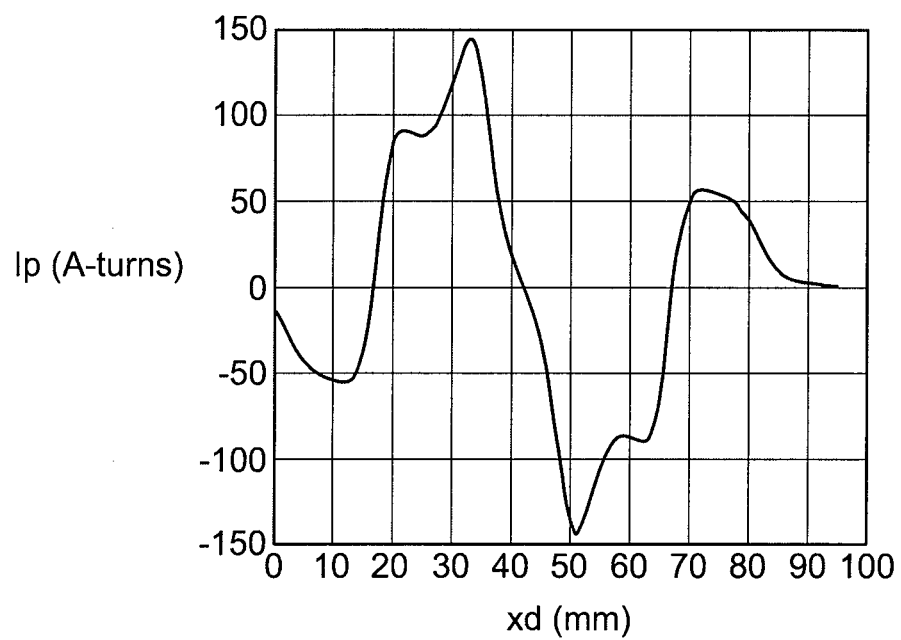
FIG. 7 shows a typical waveform of current in a coil as a vehicle moves by in a system according to one practice of the invention.
Figure 8:
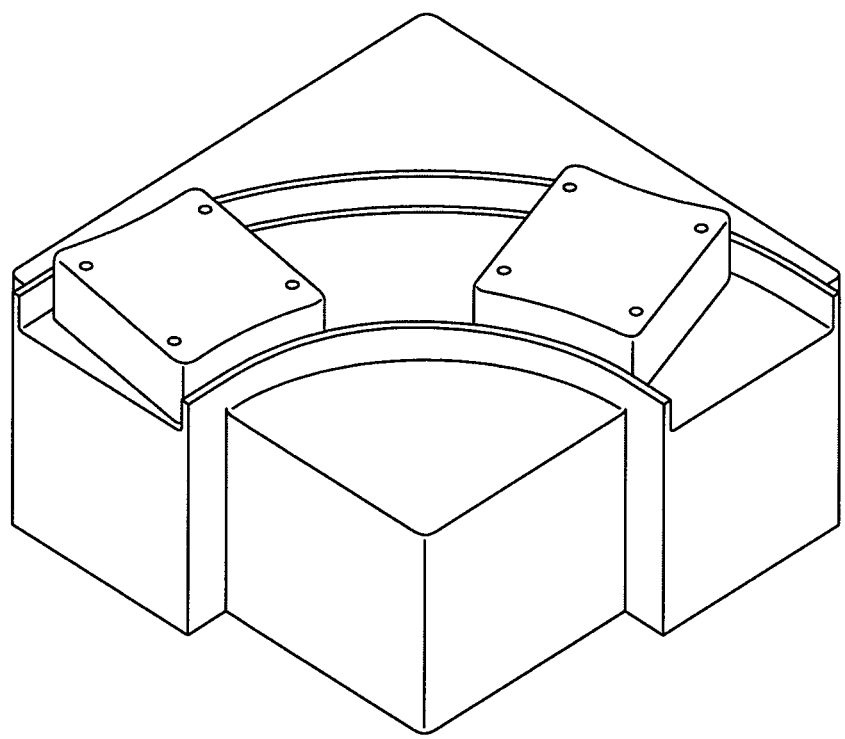
FIG. 8 shows vehicles negotiating a sharp 90° horizontal turn in a system according to one practice of the invention.

The illustrated embodiment permits the control of each coil individually without the cost associated with conventional designs. With reference to FIG. 6, there is shown an embodiment in which the coils 62 are mounted directly on a Printed Circuit Board (PCB) 64. This board supports the coils and provides connections between the coils and the power electronic modules that control the current. Typically each coil is connected to the output of an "H-bridge" with MOSFET or IGBT devices used to control the amount and direction of current in each coil. These components are mounted on the same PCB. The PCB also holds Hall Effect devices that sense the magnetic field produced by the vehicle and allow a microprocessor to create a desired force. FIG. 7 shows a typical waveform of the current in a propulsion coil that will propel a vehicle as it moves by the coil. By proper choice of waveform several propulsion coils can work in unison to create a constant force on the vehicle with minimum power loss in the coil. For braking the sign of the current is reversed.

By mounting the coils directly on a PC board and by using integrated power controllers it is possible to reduce the cost for the coils and electronics. One microprocessor can control a multiplicity of H-bridges but with a coil spacing on the order of 16 mm there can be more than a dozen microprocessors per meter of motor, and the operation of these motor controllers must be coordinated by a higher level "node" controller. With modern semiconductor technology, and for low to moderate power levels, all of these components can be mounted on only one or two PCBs that are contained in the motor housing.

Guideway Modules

The guideway is built of modules much as a model train layout is constructed from modules. FIGS. 6, 8-11 and 13 show examples of a straight section, a 90° horizontal curve, a 180° vertical curve, a right diverge switch, a turntable, and a vertical transition. These components can be interconnected in a variety of ways to meet the requirements of many and diverse applications.

Figure 9:
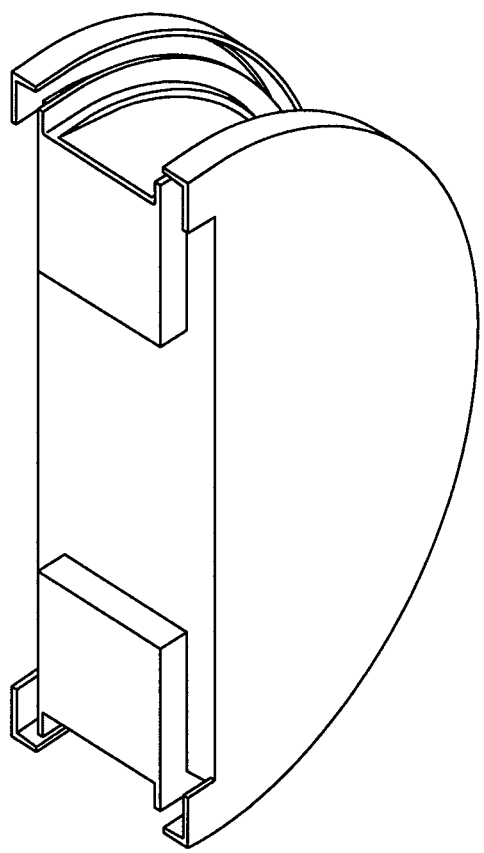
FIG. 9 shows vehicles negotiating a sharp 180° vertical turn in a system according to one practice of the invention.

The 180° vertical curve in FIG. 9 is primarily used as a means to return empty vehicles to a starting point and vehicles negotiating this curve may be controlled and propelled by other means than an LSM. For example, vehicles going down may be propelled by gravity and vehicles going up may be propelled by interaction with a mechanical mechanisms and in both cases there may not be precise control during the curve transition. It is preferable that once the vehicles have negotiated this curve precise control is regained. In some cases there is a vertical curve with a much larger curve radius, such as used as a transition between a level guideway and an inclined guideway. (See, for example, FIG. 13). In this case LSM propulsion can be used for the vertical curve and thereby retain precise control through the curve.

Figure 10:
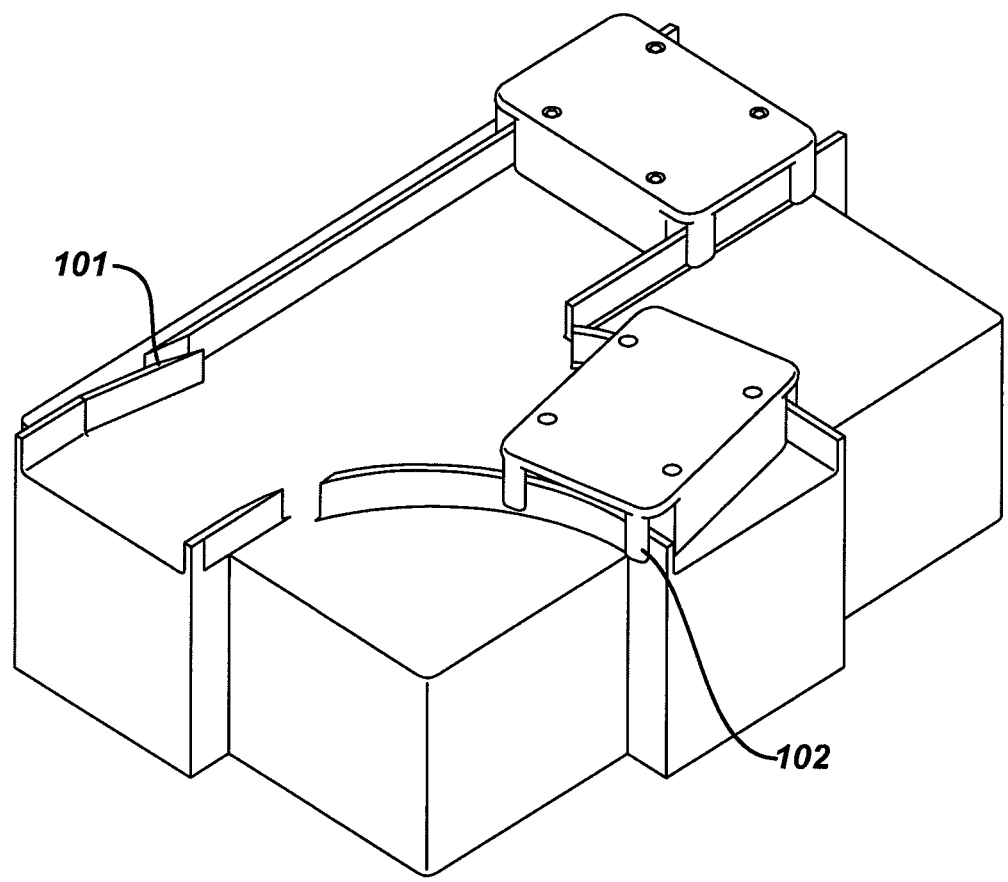
FIG. 10 shows a right diverge in a system according to one practice of the invention with vehicle direction determined by the position of a small flipper.

FIG. 10 shows a right diverge using a small mechanical or magnetic flipper 101 that directs a moving vehicle to go either straight ahead or diverge to the right. The flipper is controlled by a linear or rotary actuator that interacts with pins 102 on the vehicle to steer the vehicle in the correct direction. The same device can be used to merge two streams of vehicles. The flipper is small and light so it can move from one position to another in a small fraction of a second and thereby allow high throughput with adjacent vehicles able to be switched independently. A left diverge can be constructed as a mirror image of the right diverge.

Figure 11:
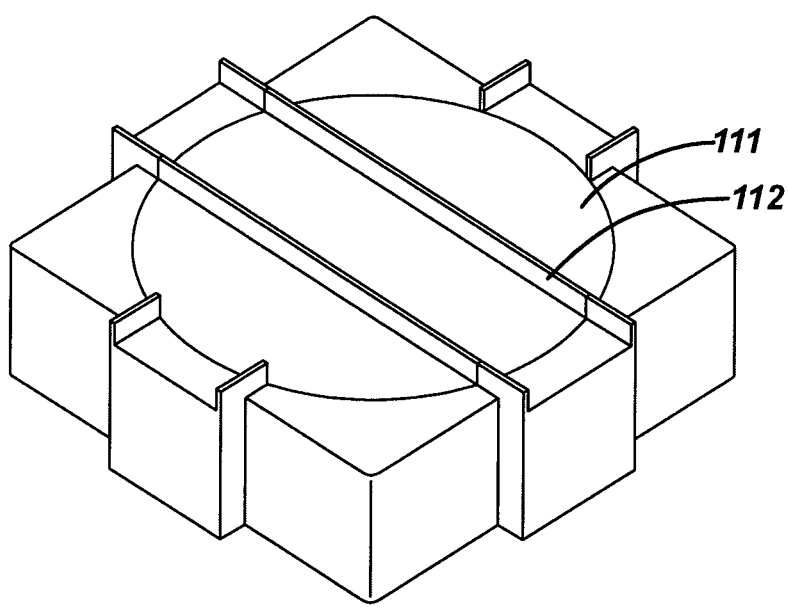
FIG. 11 shows a turntable which can be used in a system according to one practice of the invention in lieu of a curve to effect diverge and merge operations.

FIG. 11 shows a turntable 111 as an alternative to the flipper. Guidance rails 112 on the turntable and propulsion coils, not shown, guide and propel the vehicle. The turntable in FIG. 11 can rotate in 90° increments, but other designs can support motion for a variety of angles. The turntable tends to be slower than the flipper because of the added mass, but is less expensive for some applications and has greater versatility because it can be used in lieu of curves as well as to reverse vehicle direction and switch between a multiplicity of tracks.

Figure 13:
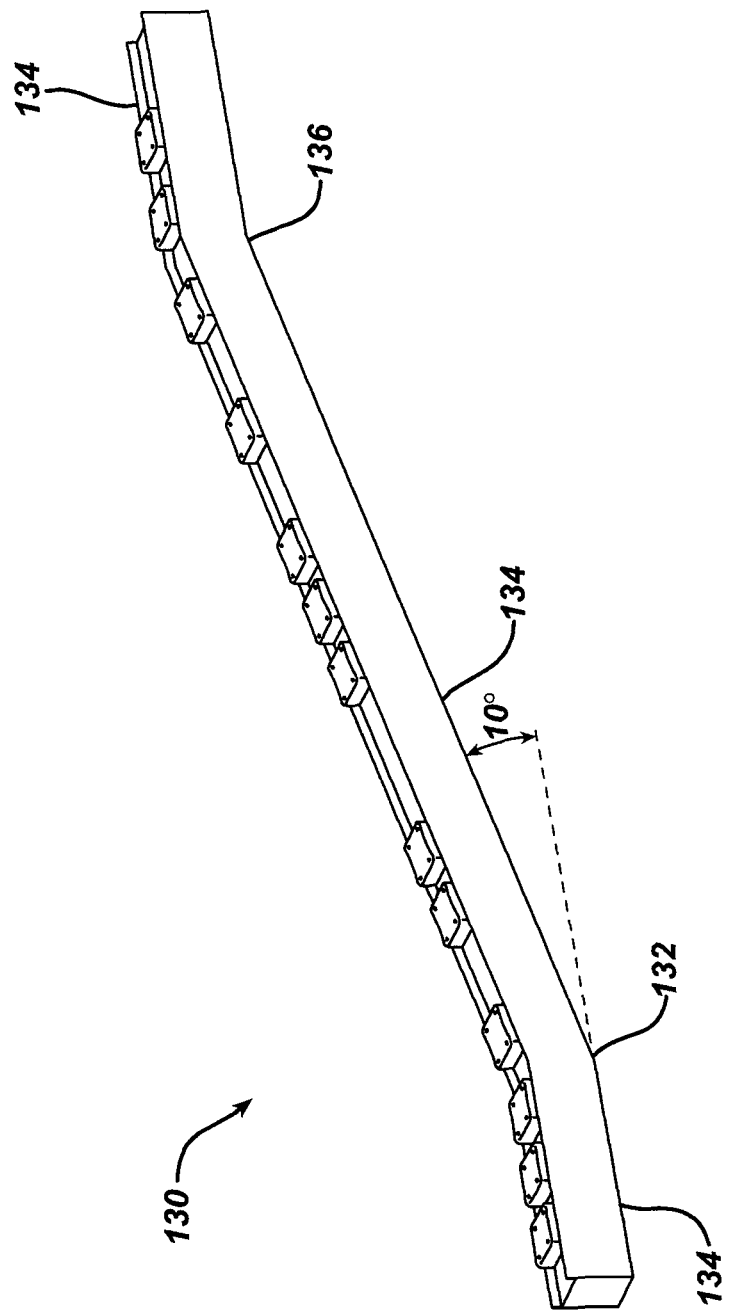
FIG. 13 shows a vertical transition in a system according to one practice of the invention.

FIG. 13 depicts a vertical transition 130. In the illustrated embodiment, this includes a concave transition piece 132, straight sections 134 and a convex transition piece 136, coupled as shown. The illustrated transition is 10° along the vertical axis, though, in other embodiments greater or lesser angles may be employed. Although the angle of the vertical transition shown here is established by transition pieces 132, 136, in other embodiments the transition may be defined by other pieces (e.g., incorporated into diverges, straight-sections, and so forth).

The switching function can also be provided by magnetic forces acting on the vehicle. For example, coils on and near the guideway can be controlled so as to create lateral forces that will perform the switching function. This approach to switching is described in U.S. Patent Application US 2007/0044676, entitled "Guideway Activated Magnetic Switching of Vehicles," the teachings of which are incorporated herein by reference.

Figure 12:
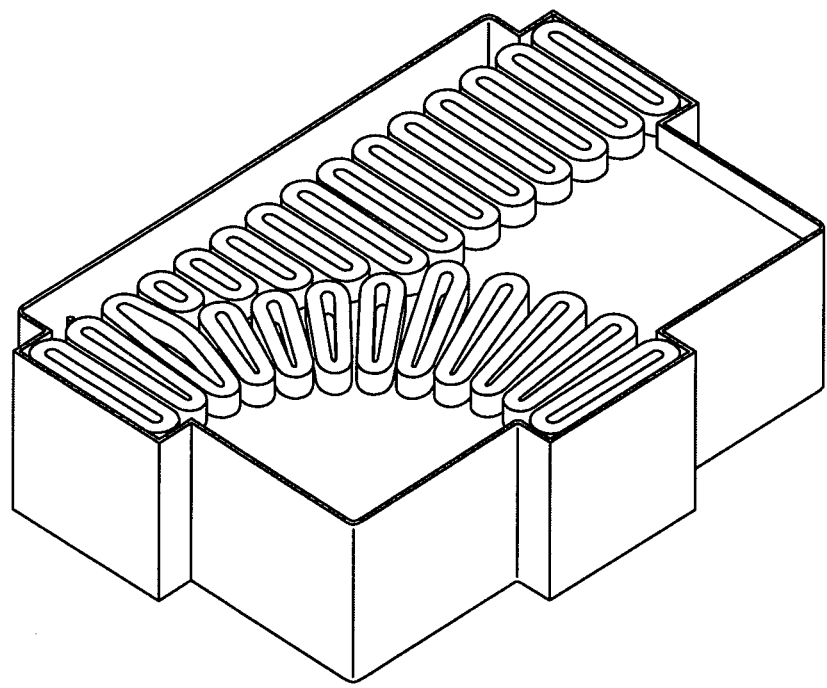
FIG. 12 shows propulsion coils providing continuous force on vehicles moving on a right diverge module of a system according to the invention.

FIG. 12 shows a cutaway view of a guideway diverge module showing propulsion coils for propelling vehicles on either of two paths. This continuous propulsion through a diverge or merge is essential to providing precise position control at all times.

A further appreciation of techniques for packaging the linear motor and other module components of the guideway modules may be attained by reference to U.S. Pat. No. 6,578, 495, entitled "Modular Linear Motor Tracks and Methods of Fabricating Same," assigned to the assignee hereof, the teachings of which are incorporated herein by reference.

Application Example

Figure 14:
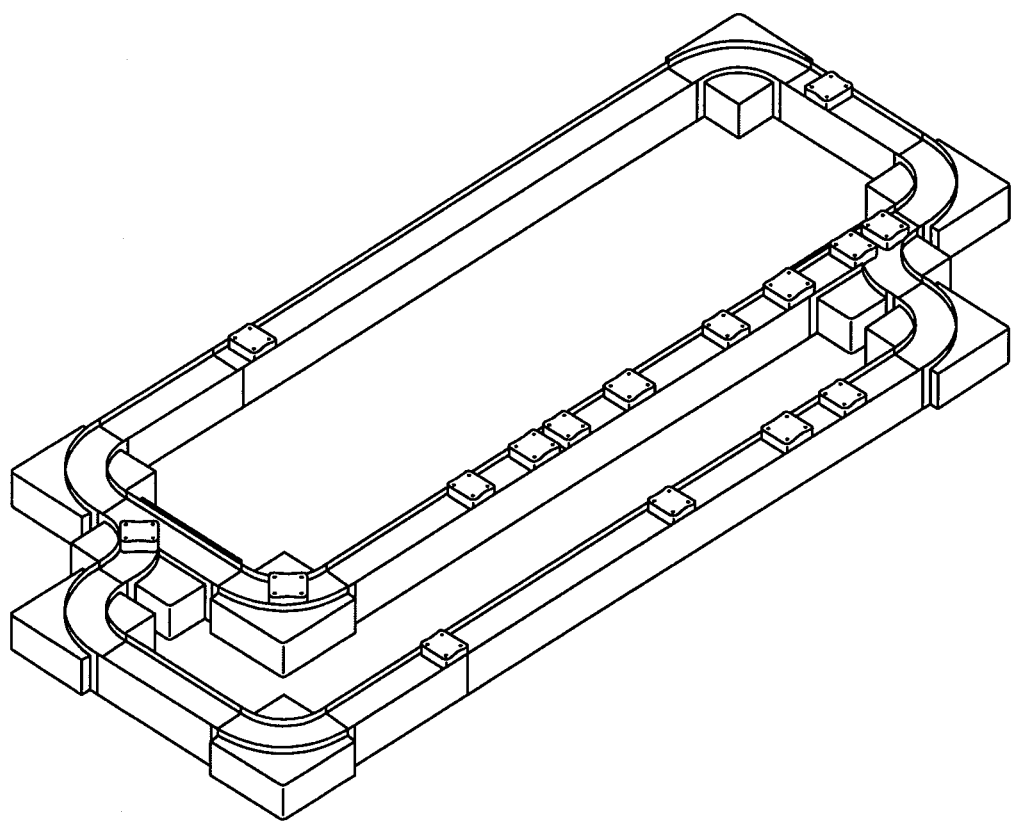
FIG. 14 shows an example of a system according to the invention.

There are many possible applications but the simple layout in FIG. 14 shows how the guideway modules can be interconnected. Vehicles move around the main loop but can move though a bypass when desired. Typical applications will use many more guideway modules than in this simple example.

Additional Embodiments

As evident in FIGS. 1-14, in some embodiments the running or sliding surface of the guideway comprises an upper surface of the guideway immediately adjacent the propulsion coils, for example, as indicated by surface 63 and coils 64 of FIG. 6 and discussed above. In other embodiments, such a running or sliding surface can be another upper-facing (or vehicle-contacting) surface of the guideway—for example, a surface of a rail, ledge, recess, or flange of the guideway. That surface can be immediately adjacent to the coils 64 or offset therefrom.

Figure 15:
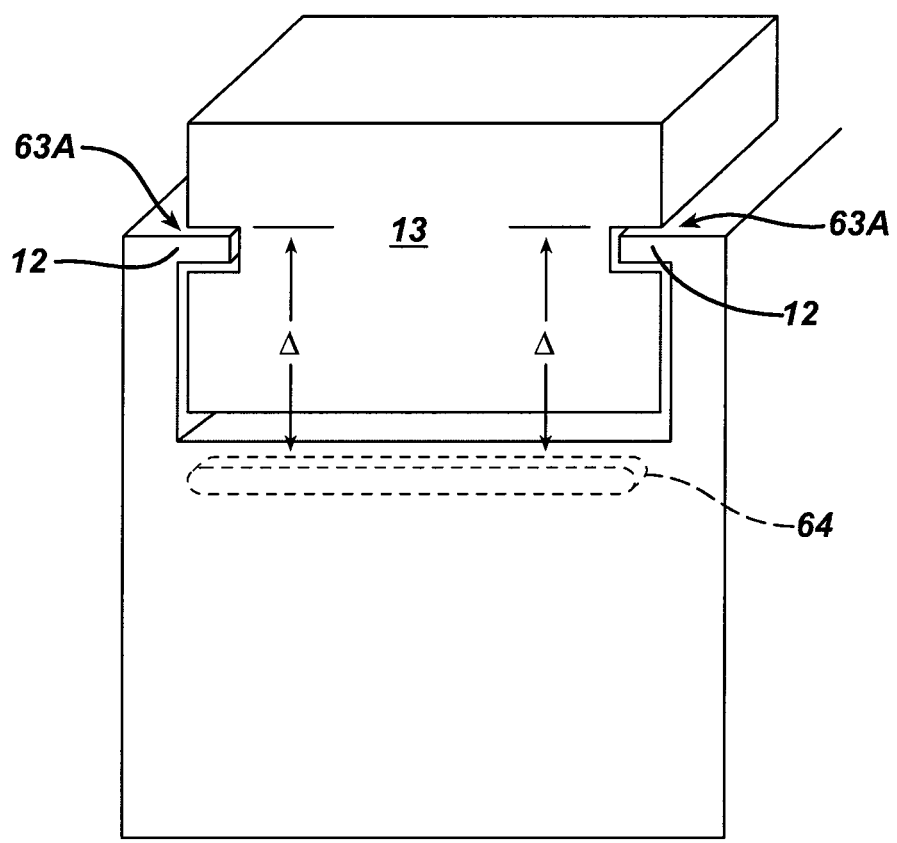
FIGS. 15-16 shows a guideway and vehicle in a system according to one practice of the invention.
Figure 16:
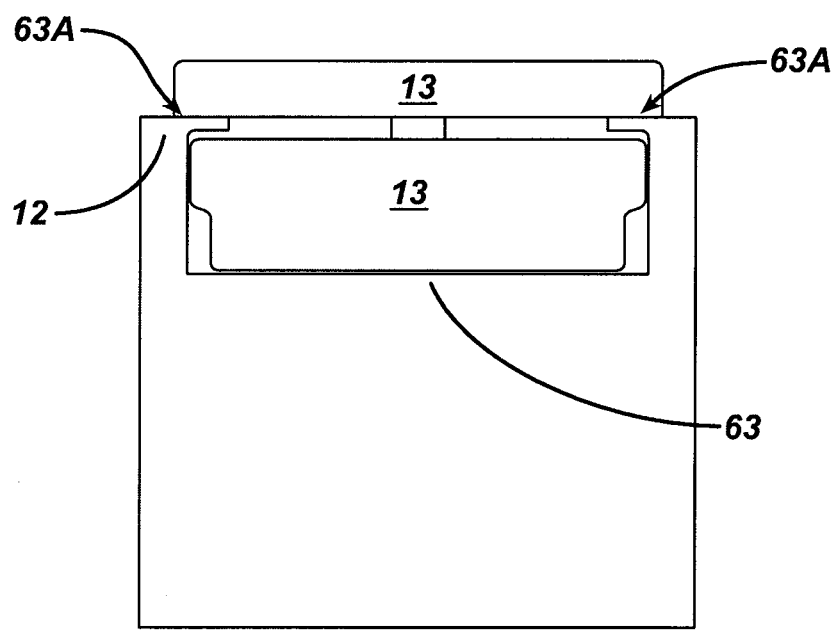

This is shown, for example, in FIG. 15, wherein surfaces 63A, which are offset from the coils by a distance Δ provide low friction running (or "sliding") surfaces that support the vehicle 13. The two surfaces 63A are shown in the drawing, other embodiments may incorporate fewer or greater such surfaces in (or out) of combination with other surfaces, such as surface 63 of FIG. 62. This is shown, for example, in FIG. 16. In the embodiments of FIGS. 15 and 16, running surfaces 63A of the guideway form part of guidance rails 12, though, in other embodiments these may comprise separate structures of the guideway (or otherwise).

Likewise, as also evident in FIGS. 1-14, in some embodiments the running or sliding surfaces of vehicles 13 can be provided by sliders 32 or other components of the vehicles), for example, as indicated by FIG. 3 and discussed above. In other embodiments, such running or "sliding" surfaces can be other downward-facing (or guideway-contacting) surfaces of the vehicles—for example, surfaces of rails, ledges, recesses, or flanges of the vehicles. This too is shown, for example, in FIG. 15, wherein surfaces 32A provide low friction running (or "sliding") surfaces that slide on the running or sliding surface of the guideway, here, surfaces 63A.

In embodiments such as those shown in FIG. 15, as well as in other embodiments of the invention, the sliding surfaces 32A, 63A, and so forth, are sized and otherwise designed to minimize the coefficient of friction cf, as discussed above, as well as to provide adequate support for the vehicles 13 under expected operating conditions.

Figure 17:
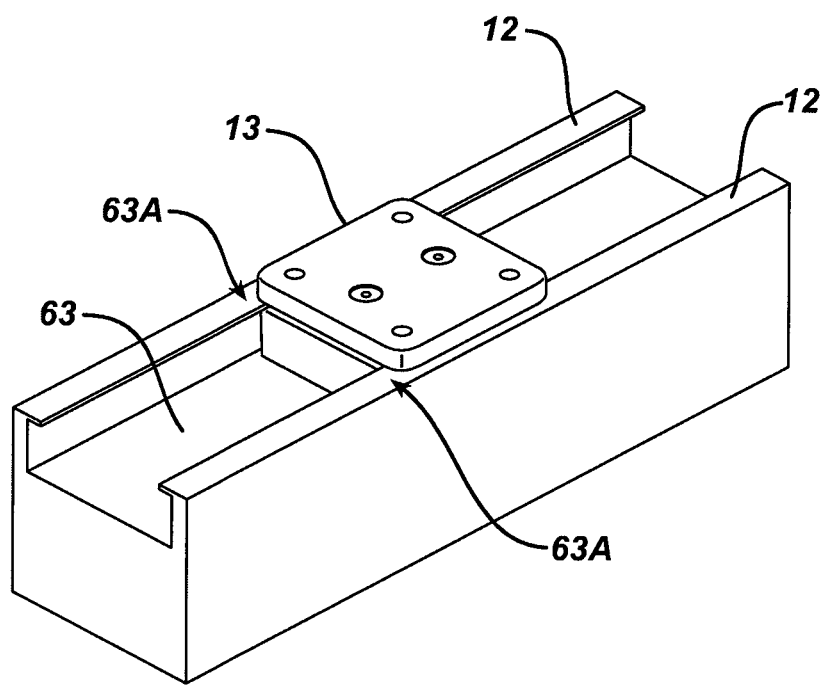
FIG. 17 is a perspective view of a straight-away section of a guideway in a system according to one practice of the invention.
Figure 18:
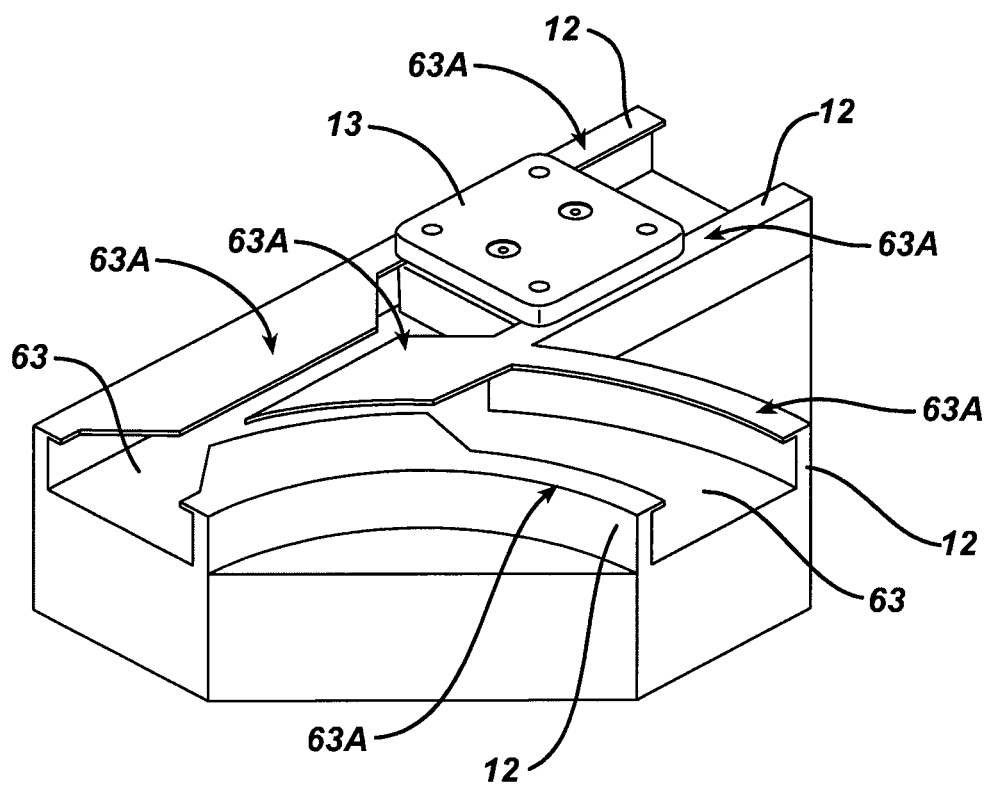
FIG. 18 is a perspective view of a right-diverge section of a guideway in a system according to one practice of the invention.
Figure 19A:
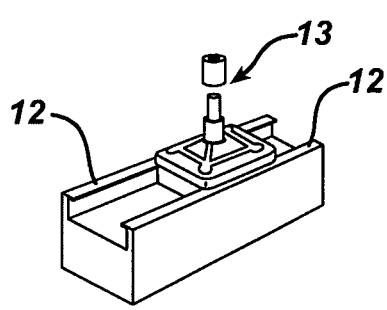
FIGS. 19A-19D show alternate configurations of sections of a guideway in a system according to one practice of the invention.
Figure 19B:
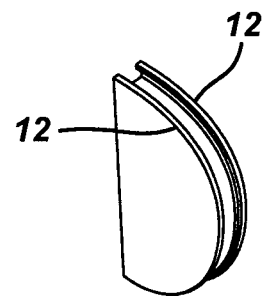
Figure 19C:
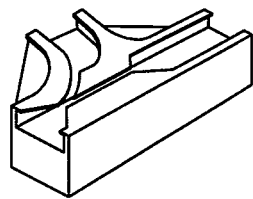
Figure 19D:
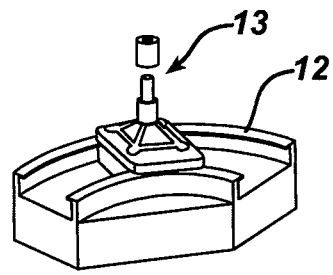

A further appreciation of the embodiments shown in FIGS. 15-16 may be attained by reference to FIG. 17, which is a perspective view of a straight-away section of a guideway of such embodiments; FIG. 18, which is a perspective view of a right-diverge section of a guideway of such embodiments; FIGS. 19A-19D, which are perspective views of straight-away, left-diverge, vertical turn, and curve sections of a guideway of a such embodiments.

In regard to FIG. 18 and other sections that support a merge or diverge function, the running services 63A of rails 12 can be broadened and/or narrowed, e.g., as shown in the drawing, in order to provide greater a guidance or channeling function.

Figure 21:
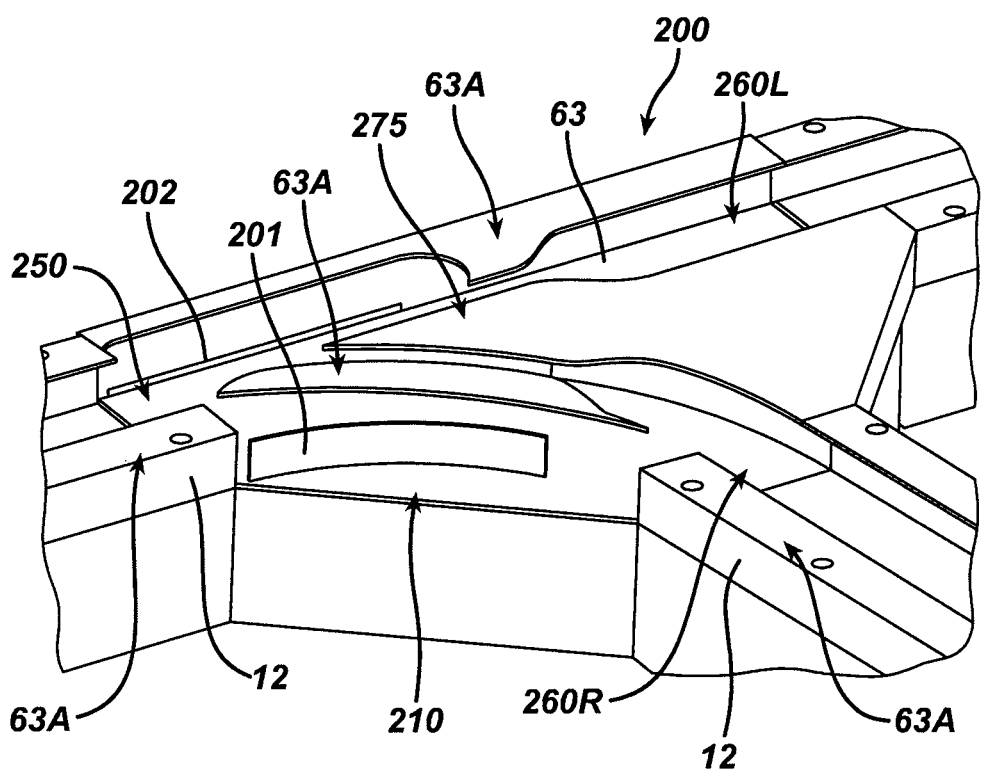
FIG. 21 is a cut-away perspective view of a right-diverge section of a guideway in a system according to one practice of the invention.

As evident in the discussion above and shown in the drawings, switching can be effected via turntables, as well as by the use of mechanical flippers or magnetic switching members acting at or near merge or diverge regions of the guideway. Guideway configurations utilizing the latter are more fully detailed in FIGS. 20A-20B and 21 and discussed below. Though only diverge sections are shown in those drawings, it will be appreciated that flipper and switch arrangements as shown herein can be employed with other guideway modules and/or configurations, as well.

Referring to FIGS. 20A and 20B, there is shown a diverge or switching region of a guideway according to one practice of the invention. The illustrated diverge region 200, which may comprise one or more modules of the type described above (albeit configured and operated as discussed here), comprises an ingress path 250 and two or more egress paths, here, egresses 260L and 260R, as shown. A switching member, e.g., flipper 201, is disposed along a lateral (or outside) portion 270 of the guideway region 200 and, indeed, can be disposed within a lateral (or side) rail 270 of the guideway, as shown. In other embodiments, the switching member 201 may be disposed on a medial portion of the guideway 275, e.g., at or closer to a centerline 280 of travel of vehicles moving thereon, or otherwise. Regardless, the flipper 201 (or other switching member) is preferably disposed along the guideway at a location at or near a point where the egresses diverge from one another (e.g., the branch-point or crotch of the diverge).

The switching member 201 comprises a ferromagnetic material suitable for effecting magnetic attraction between the member 201 and a passing vehicle—i.e., a vehicle that is moving on the guideway in vicinity of the member 201 (e.g., near the branch-point of the diverge)—e.g., in a direction transverse to the vehicle's direction of motion along the guideway and, thereby, selectively altering the course of the passing vehicle. In the illustrated embodiment, such attraction is particularly effected between the member 201 and a permanent magnet disposed on such a vehicles, though, in other embodiments, attraction may be to other magnetic elements on the vehicle. Illustrated switching member (here, flipper 201) is shaped as a flat, rectilinear member, though, in other embodiments it may be shaped otherwise.

Referring to FIGS. 20A and 20B, an actuator 300 is coupled (e.g., via rod 301 or otherwise) to the switching member 201 in order to place the switching member in a first position (and, more generally, in a first configuration), whereby the switching member exerts a greater lateral magnetic attractive force on the passing vehicle and, thereby, causes it to exit the diverge region 200 via one of the egresses, place the switching member in a second position (and, more generally, in a second configuration), whereby the switching member exerts a lesser lateral magnetic attractive force on the passing vehicle and, thereby, causes it to exit the diverge region 200 via another of the egresses, move the switching member 201 between the first and second positions (or configurations).

The actuator may comprise a servo, solenoid, lever, spring, motor, or other mechanism (or combination thereof) of the type known in the art suitable for so placing and moving the switching member. The actuator may operate under control of a microprocessor or other control device (not shown) of the conventional type known in the art (as adapted in accord with the teachings hereof) to route the passing vehicle passing through diverge region.

With reference to FIG. 20A, the actuator 300 is shown positioning flipper 201 in the first configuration—here, pivoted on a fixed end 201A (e.g., on pin or other pivot member) such that a free end 201B is rotated into a first rotational position—in order to effect passage of the vehicle (here, represented by arrow 220) to egress 260R. With reference to FIG. 20B, the actuator 300 positions flipper 201 in the second configuration—here, pivoted on fixed end 201 such that a free end 201B is rotated into a second rotational position—in order to effect passage of the vehicle (here, represented by arrow 221) to egress 260L.

As evident in these drawings, the first and second configurations of the illustrated embodiment represent differing rotational positions of the flipper 201 that place the free end 201B closer (in the case of FIG. 20A) and further (in the case of FIG. 20B) to the passing vehicle and which, thereby, effects differing attractive forces on it. In other embodiments, other configurations may be utilized instead or in addition. By way of example, the free and fixed ends of the flipper 201 of may be reversed (e.g., from that shown in the drawing). By way of further example, the actuator may be coupled with the flipper (or other switching member) so that the entire member 201 (as opposed to merely a free end) is disposed closer to vehicle in the first configuration and further in the second configuration. By way of still further example, the flipper or other member may be flexible and the actuator may be disposed so as to cause it to bend so that portions of it are closer to the vehicle in the first configuration and to bend further from the vehicle in the second configuration. These and other alternatives will be evident to those of ordinary sill in the art in view of the teachings hereof.

Though only a single moveable switching member 201 is shown in the drawings and described above, it will be appreciated that another such member may be provided, as well. This may be, for example, a moveable switching member that is like member 201, but that is disposed along a lateral portion of the guideway region 200 opposite member 201 (along the guideway at a location at or near the branch-point or crotch of the diverge) and that moves in cooperation with illustrated member 201 to facilitate routing the passing vehicle to the first or second egresses.

Alternatively, the further member may be a non-moveable (or fixed) member—such as a permanent magnet or other ferromagnetic element—that effects a magnetic attraction force on the passing vehicle sufficient to bias it toward a one of the egresses, thereby, insuring routing of the vehicle to that egress, when the switching member 201 is not positioned (by the actuator 300) to effect routing to the another egress. Such a fixed element may be disposed along a lateral portion of the guideway region 200 opposite illustrated switching member 201 or otherwise (e.g., on a medial portion of the guideway). As with moveable member 201, the non-moving member disposed along the guideway at a location at or near the branch-point or crotch of the diverge, and it may be shaped as a flat, rectilinear member—or otherwise.

Further appreciation of the exemplary switching embodiment discussed above can be attained by reference to FIG. 21, which is a cut-away perspective view of a right-diverge section 200 of a guideway similar to that shown in FIG. 18. Portions of the guidance rails 12 and the surfaces 63A are not shown in FIG. 21 so that the flipper 201 and fixed-plate non-moveable member 202 of the type discussed above can be seen. As illustrated, the flipper 201 is disposed in a gap 210 between opposed portions of the guidance rails 12.

A further appreciation of the embodiments discussed above may be attained by the following remarks:

The operation of illustrated diverge region 200 depends on the attraction forces between permanent magnet on the vehicle and the ferromagnetic plates on the side of the guideway. The magnets one the vehicle are primarily used to produce a field below the vehicle for propulsion, but there is a strong enough field on the side of the vehicle to create enough force for controlling the vehicle direction. If desired, additional magnets could be added solely to facilitate switching.

As discussed above, FIG. 21 shows a small fixed plate 202 on the side of the straight side of the diverge 200 and a movable plate 201 on the diverge side. If it is desired that the vehicle go straight, the movable plate 201 can be positioned several millimeters from the edge of the guideway so there is not much force tending to pull the vehicle into the diverge. In this case the plate 202 on the straight side ensures that the vehicle goes straight. If it is desired that the vehicle diverge, than the movable plate 201 can be positioned in close proximity to the edge of the guideway and, because the movable plate 201 is larger than the fixed plate 202, there is a net force pulling the vehicle into the diverge path. As the vehicle begins to diverge, the differential force increases and becomes large enough to counter the centrifugal force of the turning vehicle.

There are several ways in which the movable plate 201 can be controlled. For example, it can be attached to a pivot and driven by a rotary motor, or it can be moved laterally by magnetically based forces.

In some embodiments, the switching function is provided by magnetic forces applied to a vehicle traveling on the guideway. The magnetic forces can be used to control the direction of a vehicle at a diverge region of the guideway or at a merge region of a guideway. For example, one or more switching members, e.g., a flipper, can be disposed on the guideway. The one or more switching members can be configured so that when at least one of the one or more switching members is activated, e.g., by moving, a magnetic flux between the at least one of the one or more switching members and a magnetic flux source on the vehicle is changed. For example, the switching member can move by pivoting, translating, bending, or any combination thereof.

The magnetic flux source on the vehicle can include permanent magnets or electromagnets. The magnetic flux source used for switching can also be used to provide the means for LSM propulsion. However, the vehicle can also include additional and separate permanent magnets or electromagnets configured to provide a magnetic flux source separate from any magnetic flux source used for propulsion.

Discussed above are diverge regions that utilize magnetic switching members acting at or near merge or diverge regions of the guideway. It will be appreciated that the illustrated embodiment is just an example of transport systems and modules providing such regions. Thus, for example, though the moveable and fixed switching members referred to here effect magnetic attraction with a vehicle in the vicinity thereof on the guideway, in other embodiments, one or more of the switching members may rely on magnetic repulsion instead. And, though the illustrated diverge region has straight and branched egresses, diverge regions of other embodiments may be of different configuration. For example, the diverge region may be Y-shaped. Moreover, it may have (instead or in addition) additional egresses.

Described above are systems, apparatus and method meeting the foregoing objects, among others. It will be appreciated that the embodiments illustrated and discussed herein are merely examples of the invention and that other embodiments, incorporating changes thereto, fall within the scope of the invention. Thus, by way of non-limiting example, the invention can be practiced with embodiment in which suspension is provided by air-cushion and fluid-cushion, e.g., in addition to the wheel-less, wheeled, and other roller-based designs discussed above, of which

We claim:

1. A transport system, comprising:
   A. a guideway that guides one or more vehicles and that includes at least one of a merge region and a diverge region,
   B. one or more vehicles disposed on the guideway, each containing a magnetic flux source,
   C. electronic power and control circuitry that excites a plurality of propulsion coils so as to propel the one or more vehicles independently of one another along the guideway,
   D. each of the merge region and diverge region defining first and second pathways on the guideway, wherein the merge region and the diverge region comprise a first plurality of propulsion coils extending continuously along the first pathway to propel the one or more vehicles along the first pathway and a second plurality of propulsion coils adjacent to the first plurality of propulsion coils and extending continuously along the second pathway to propel the one or more vehicles along the second pathway, wherein each plurality of propulsion coils is operable to propel the one or more vehicles along their respective pathways.

2. The transport system of claim 1, wherein the guideway comprises a straight-away region, along with at least one of a merge region and a diverge region.

3. The transport system of claim 1, wherein one or more of the vehicles are slidingly disposed on the guideway.

4. The transport system of claim 3, wherein one or more of the vehicles that are slidably disposed on the guideway have a low coefficient of friction therewith.

5. The transport system of claim 4, wherein the coefficient of friction is less than substantially 0.2.

6. The transport system of claim 1, wherein one or more of the vehicles are disposed for rolling motion on the guideway.

7. The transport system of claim 1, wherein one or more of the vehicles are disposed on wheels for rolling motion on the guideway.

8. The transport system of claim 1, wherein the plurality of propulsion coils are disposed along the first and second pathways of the merge region and the diverge region.

9. The transport system of claim 1, wherein at least one of said merge regions and diverge regions comprises a plurality of coreless propulsion coils disposed along a corner, curve and/or branch defining the merge or diverge, respectively, so as to propel the vehicles therethrough.

10. The transport system of claim 1, further comprising
    A. a switching member having (i) a first configuration that is associated with motion of the vehicle along the first path, and (ii) a second configuration that is associated with motion of the vehicle along the second path,
    B. wherein the switching member is selectively moveable from the first configuration to the second configuration.

11. The transport system of claim 1, wherein any of the merge region and the diverge region includes a switching element that initiates switching of a vehicle from the first pathway to the second pathway by exerting a laterally directed force on the vehicle.

12. The transport system of claim 11, wherein the switching element comprises a mechanically actuated switch.

13. The transport system of claim 11, wherein the switching element comprises a magnetically actuated switch.

14. A guideway module defining any of a merge region and a diverge region for use in a transport system, the guideway module altering a course of a vehicle passing thereover, comprising:
    A. a plurality of coreless propulsion coils disposed along a region in which one or more vehicles that include magnetic flux sources are to be propelled,
    B. electronic power and control circuitry that excites one or more of the plurality of propulsion coils independently of one or more other propulsion coils in any of
       (a) the guideway module, and
       (b) a guideway in which that guideway module is incorporated, so as to independently propel one or more vehicles passing over the guideway module
    C. any of the merge region and the diverge region defining a first path and a second path over the guideway module, wherein a first plurality of propulsion coils extends continuously along the first path to propel the vehicle along the first path and a second plurality of propulsion coils adjacent to the first plurality of propulsion coils extends continuously along the second path to propel the vehicle along the second path, wherein each plurality of propulsion coils is operable to propel the one or more vehicles along their respective paths.

15. The guideway module of claim 14, wherein the plurality of coreless propulsion coils are disposed along the first path and the second path of the guideway module.

16. The guideway module of claim 14, comprising a plurality of coreless propulsion coils disposed along a corner, curve and/or branch defining the merge or diverge, respectively, so as to propel the vehicles therethrough.

17. The transport system of claim 14, further comprising a switching member having (i) a first configuration that is associated with motion of the vehicle along the first path, and (ii) a second configuration that is associated with motion of the vehicle along the second path,
    wherein the switching member is selectively moveable from the first configuration to the second configuration.

18. The guideway module of claim 14, wherein any of the merge region and the diverge region includes a switching element that initiates switching of a vehicle from the first path to the second path by exerting a laterally directed force on the vehicle.

19. The guideway module of claim 18, wherein the switching element comprises a mechanically actuated switch.

20. The guideway module of claim 18, wherein the switching element comprises a magnetically actuated switch.

21. A vehicle for use in a transport system, comprising a flux source and adapted to be propelled along a guideway comprising:
    A. a plurality of coreless propulsion coils disposed along a region in which one or more vehicles that include magnetic flux sources are to be propelled, the region defining a first path and a second path on the guideway, wherein a first plurality of propulsion coils extends continuously along the first path to propel the vehicle along the first path and a second plurality of propulsion coils adjacent to the first plurality of propulsion coils extends continuously along the second path to propel the vehicle along the second path, wherein each plurality of propulsion coils is operable to propel the one or more vehicles along their respective paths,
    B. electronic power and control circuitry that excites one or more of the plurality of propulsion coils independently of one or more other propulsion coils so as to propel the vehicle,
    C. any of a rail, ledge, recess, or flange that comprises a running surface that is adapted for sliding motion of the vehicle along the guideway.

22. The vehicle of claim 21, further comprising a recess adapted for sliding motion along a rail of the guideway.

23. A transport system, comprising
   A. a guideway including a plurality of coreless propulsion coils disposed along a region in which one or more vehicles are to be propelled, the region defining a first path and a second path on the guideway, wherein a first plurality of propulsion coils extends continuously along the first path to propel the one or more vehicles along the first path and a second plurality of propulsion coils adjacent to the first plurality of propulsion coils extends continuously along the second path to propel the one or more vehicles along the second path, wherein each plurality of propulsion coils is operable to propel the one or more vehicles along their respective paths,
   B. one or more vehicles disposed on the guideway, each containing a magnetic flux source,
   C. electronic power and control circuitry that excites one or more of the plurality of propulsion coils independently of one or more other propulsion coils so as to propel the one or more vehicles along the guideway,
   D. the one or more vehicles being slidingly disposed on any of a rail, ledge, recess, or flange of the guideway.

24. The transport system of claim 23, further comprising a guidance structure on any of the guideway and the one or more vehicles that inhibits the one or more vehicles from moving off the guideway.

25. The transport system of claim 24, wherein the guidance structure comprises one or more rails that are disposed on the guideway.

26. The transport system of claim 25, wherein the one or more vehicles are slidingly disposed on said guidance structure.

27. A guideway module for use in a transport system, the guideway module comprising
   A. a plurality of coreless propulsion coils disposed along a region in which one or more vehicles that include magnetic flux sources are to be propelled, the region defining a first path and a second path on the guideway, wherein a first plurality of propulsion coils extends continuously along the first path to propel the one or more vehicles along the first path and a second plurality of propulsion coils adjacent to the first plurality of propulsion coils extends continuously along the second path to propel the one or more vehicles along the second path, wherein each plurality of propulsion coils is operable to propel the one or more vehicles along their respective paths,
   B. electronic power and control circuitry that excites one or more of the plurality of propulsion coils independently of one or more other propulsion coils in any of
      (a) the guideway module, and
      (b) a guideway in which that guideway module is incorporated, so as to control movement of one or more vehicles passing over the guideway module,
   C. any of a rail, ledge, recess, or flange adapted for sliding motion of the one or more vehicles thereon.

28. The guideway module of claim 27, further comprising a guidance structure that inhibits motion of the one or more vehicles off the guideway.

29. The guideway module of claim 28, wherein the guidance structure comprises one or more rails on which the one or more vehicles are adapted to be slidingly disposed.

30. A transport system, comprising:
   A. a guideway that includes a plurality of propulsion coils and a switching region defining a first path and a second path on the guideway, and
   B. a vehicle that moves along the guideway and that includes a magnetic flux source,
   wherein a first plurality of propulsion coils extends continuously along the first path to propel the vehicle along the first path and a second plurality of propulsion coils adjacent to the first plurality of propulsion coils extends continuously along the second path to propel the vehicle along the second path, wherein each plurality of propulsion coils is operable to propel the vehicle along their respective paths.

31. The transport system of claim 30, further comprising
   A. a switching member having (i) a first configuration that is associated with motion of the vehicle along the first path, and (ii) a second configuration that is associated with motion of the vehicle along the second path,
   B. wherein the switching member is selectively moveable from the first configuration to the second configuration.

32. The transport system of claim 30, wherein the switching member comprises a ferromagnetic material.

33. The transport system of claim 30, wherein the switching member is configured to move by at least one of pivoting, translating, and bending.

34. A method of switching a vehicle, comprising:
   providing a vehicle including a magnetic flux source;
   moving the vehicle along a pathway defined by a guideway, the guideway defining a first path and a second path having a plurality of propulsion coils disposed thereon such that a first plurality of propulsion coils extends continuously along the first path to propel the vehicle along the first path and a second plurality of propulsion coils adjacent to the first plurality of propulsion coils extends continuously along the second path to propel the vehicle along the second path, wherein each plurality of propulsion coils is operable to propel the vehicle along their respective paths.

35. The method of claim 34, further comprising actuating a switching member that initiates switching of the vehicle from the first path to the second path by exerting a laterally directed force on the vehicle.

36. The method of claim 35, wherein the switching member comprises a flipper.

37. The method of claim 35, wherein the switching member comprises a ferromagnetic material.

38. The method of claim 35, wherein actuating the switching member includes at least one of pivoting, translating, and bending.

39. A guideway module for use in a transport system, comprising a plurality of propulsion coils configured to propel a vehicle disposed on the guideway, the guideway defining a first path and a second path, wherein a first plurality of propulsion coils extends continuously along the first path to propel the vehicle along the first path and a second plurality of propulsion coils adjacent to the first plurality of propulsion coils extends continuously along the second path to propel the vehicle along the second path, wherein each plurality of propulsion coils is operable to propel the vehicle along their respective paths.

40. The guideway module of claim 39, further comprising
   A. a switching member having (i) a first configuration that is associated with motion of the vehicle along the first path, and (ii) a second configuration that is associated with motion of the vehicle along the second path,
   B. wherein the switching member is selectively moveable from the first configuration to the second configuration.

41. The guideway module of claim 40, wherein the switching member is configured to move by at least one of pivoting, translating, and bending.

* * * * *